United States Patent [19]
England

[11] Patent Number: 5,386,438
[45] Date of Patent: Jan. 31, 1995

[54] ANALOG FRONT END INTEGRATED CIRCUIT FOR COMMUNICATION APPLICATIONS

[75] Inventor: David G. England, Phoenix, Ariz.

[73] Assignee: Intel Corporation, Santa Clara, Calif.

[21] Appl. No.: 121,235

[22] Filed: Sep. 14, 1993

[51] Int. Cl.$^6$ ............................................. H04L 23/00
[52] U.S. Cl. .......................................... 375/121; 375/7; 341/144
[58] Field of Search .................... 375/7, 8, 28, 121; 341/110, 143, 144, 126, 108; 455/73, 84, 79, 85, 86; 379/100

[56] References Cited

U.S. PATENT DOCUMENTS

| | | | |
|---|---|---|---|
| 4,852,080 | 7/1989 | Ohtake et al. | 370/30 |
| 4,972,436 | 11/1990 | Halim et al. | 375/28 |
| 5,140,616 | 8/1990 | Renner | 375/8 X |

OTHER PUBLICATIONS

R. Halim et al, "An analog front end for combined high speed data and facsimile group 3 modems," Proceedings of the 34th Midwest Symposium on Circuits & Systems. I.E.E.E. vol. 2 pp. 245-248.

*Primary Examiner*—Stephen Chin
*Assistant Examiner*—Bryan Webster
*Attorney, Agent, or Firm*—Blakely, Sokoloff, Taylor & Zafman

[57] ABSTRACT

A communications analog front end which functions as an analog and digital interface in combination with a microcontroller, DSP and the telephone or cellular network, with the DSP and microcontroller for coupling to the local workstation. The invention provides independent control of a digital and audio channel, with each channel having its own A/D and D/A converter pairs, separate programmable gain and attenuation on each channel, separate sample rates (e.g., from 1.2 kHz to 44.1 kHz at 8/16 bit resolutions) for the A/D converters, two low power, high stability on-chip oscillators, sample buffering on the audio channel (256 byte FIFOs) and, independent control of programmability of D/A output voltage levels, the A/D converters, and the D/A converters. The invention is for use in a system which enables a user to communicate between a local workstation, which may or may not be connected to a local area network (LAN), and a remote workstation, which may be coupled to its own LAN, via a modem over a telephone line network or a cellular network or as a standalone unit, i.e., not coupled to the local workstation, to perform certain tasks which are not processor intensive such as, for example, retrieval of E-mail messages from the remote workstation.

11 Claims, 3 Drawing Sheets

ANALOG FRONT END INTEGRATED CIRCUIT FOR COMMUNICATION APPLICATIONS

SUMMARY OF THE INVENTION

The present invention is for use in a system which enables a user to communicate between a local workstation, which may or may not be connected to a local area network (LAN), and a remote workstation, which may be coupled to its own LAN, via a modem over a telephone line network or a cellular network, the combination of the two LANs sometimes being referred to as a wide area network (WAN). The system may also operate as a standalone unit, i.e., not coupled to the local workstation, to perform certain tasks which are not processor intensive such as, for example, retrieval of E-mail messages from the remote workstation. The system also provides the user with voice or other audio access to the telephone and cellular networks. The invention is part of what may be referred to as a self-contained or personal wireless communication unit which includes a keypad, LED display and digital signal processor (DSP) and microcontroller. Specifically, the invention is a communications analog front end which functions as an analog and digital interface in combination with a microcontroller, DSP and the telephone or cellular network, with the DSP and microcontroller for coupling to the local workstation. The DSP and microcontroller also provide the necessary intelligence and most of the necessary modem functionality when the system is not connected to the local workstation, and when it is so connected, the DSP converts data from the local workstation to a form suitable for sending over phone lines and visa versa. In other words, the DSP handles low level communications protocols needed to transfer data to and from its digital form in the workstation to an analog form for transmission over telephone or cellular networks.

Preferably, the invention includes the following features and capabilities:

a) A modem channel capable of handling up to V. Fast protocols;
b) An audio channel compatible with communication protocols such as AMPS;
c) An A/D converter for monitoring functions (battery level, etc.);
d) A comparator for modem monitoring;
e) Operation from a single 5 V supply;
f) Serial interface compatible with standard DSPs on modem channel, e.g. ADSP21xx, TMS320Cxx;
g) Controlled power down modes; and
h) Companding options on the audio channel.

To provide the required functionality, the invention provides:

a) Independent control of the digital and audio channels, with each channel having its own A/D and D/A converter pairs;
b) Separate programmable gain and attenuation on each channel;
c) Separate sample rates (e.g., from 1.2 kHz to 44.1 kHz at 8/16 bit resolutions) for the A/D converters;
d) Two low power, high stability on-chip oscillators;
e) Sample buffering on the audio channel (256 byte FIFOs); and
f) Independent control of:

i) D/A output drive capability, i.e., programmability of D/A output voltage levels;
  ii) A/D Converters;
  iii) D/A Converters.

In a preferred embodiment, the invention is implemented as an application specific integrated circuit (ASIC) to minimize the size and power requirements of the communication unit in which it is utilized.

Although much of the functionality performed by the present invention may be obtained using a combination of prior art systems, the present invention enables such functionality to be provided in a single self-contained, relatively compact unit having low power requirements.

DETAILED DESCRIPTION OF THE INVENTION

Figure 1:
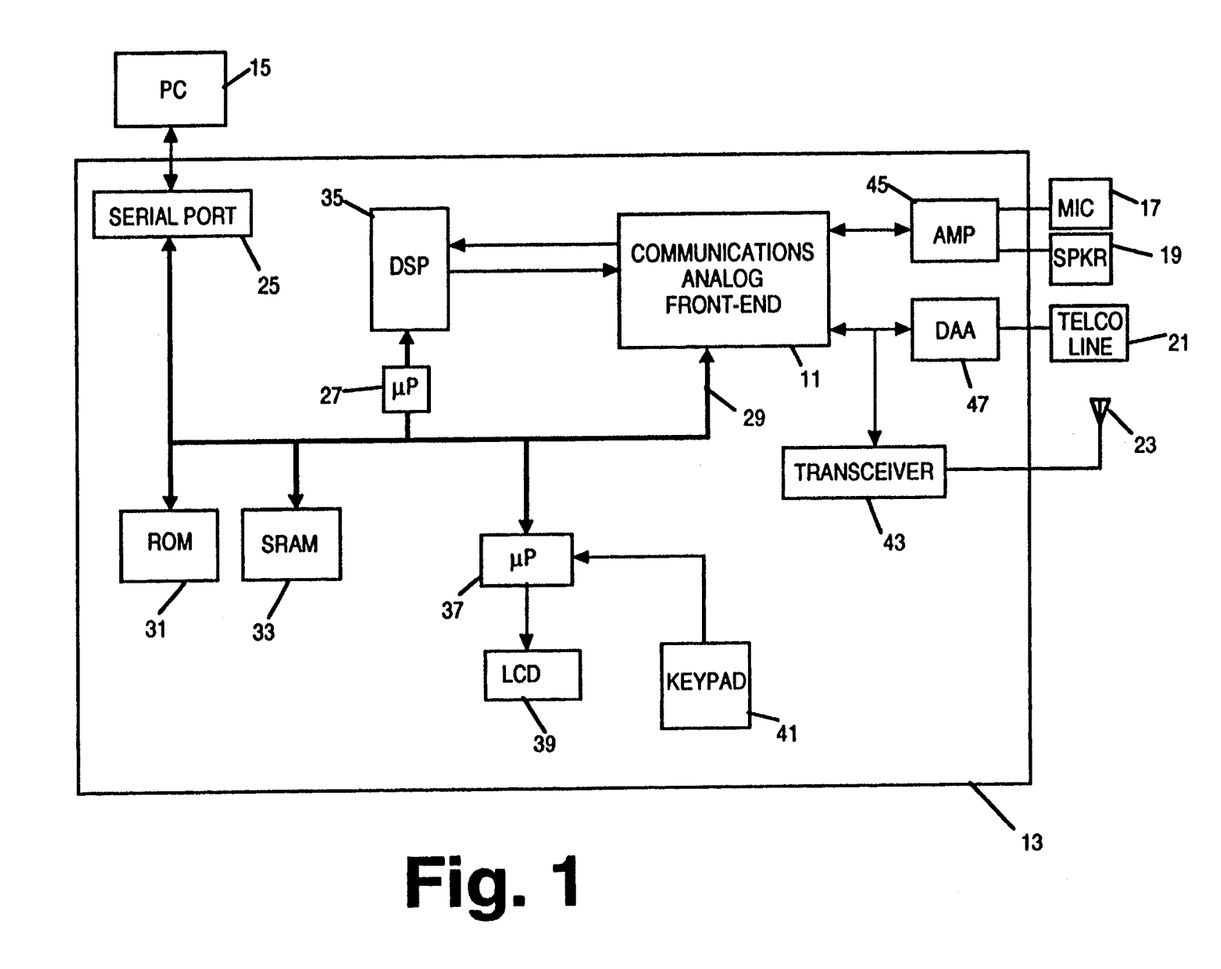
FIG. 1 is a block overview diagram showing a typical system in which the present invention may be utilized.

FIG. 1 is a block overview diagram illustrating a system in which the invented communications analog front end 11 may be utilized. Such system includes a self-contained unit 13 to which may be coupled a personal computer 15, a microphone 17, a speaker 19, a telephone company line 21 and an antenna 23. In addition to the communications analog front end, the self-contained unit contains a serial port 25 for coupling to personal computer or workstation 15 and a microcontroller 27, a bus 29 coupled to memories 31 (ROM) and 33 (SRAM), digital signal processor (DSP) 35 and the communications analog front end, a second microcontroller 37 which controls a display 39 and accepts inputs from keypad 41. The communications analog front end is also coupled to a transceiver 43 as well as to amplifiers 45 for microphone 17 and speaker 19 and data access arrangement 47 for coupling to telephone line 21. Other than the invented communications analog front end 11, the elements of unit 13 are standard, off the shelf components, or are otherwise easily constructed as described below.

Figure 2:
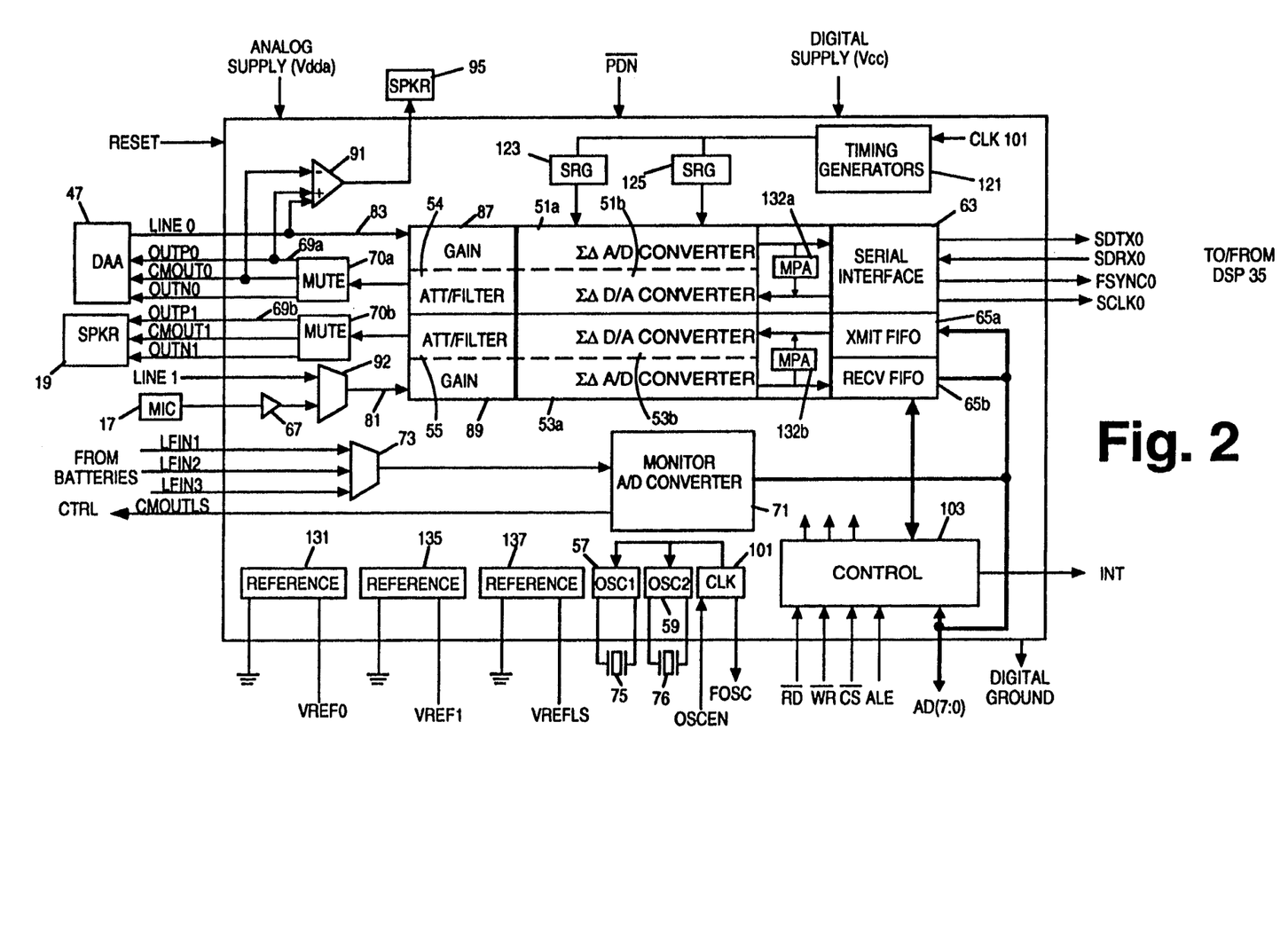
FIG. 2 is a block diagram showing the various elements of the invented communications analog front end.

The invented communications analog front end integrates the key data conversion functions used in many communication systems. With reference to FIG. 2, it includes two channels, referred to as channel 0 and channel 1, each channel using a $\Sigma\Delta$ analog-to-digital converter 51a and 53a and a $\Sigma\Delta$ digital-to-analog converter 51b and 53b. One aspect of the present invention is the inclusion in an integration of an analog front end, a mechanism which provides a variable sample rate for these converters between channels. For example, one channel may be set at a sample rate of 9.6 kHz while the other is set at 8 kHz. Channel 0 is designed to support modem functions up to V. Fast protocols, while Channel 1 is designed to support audio processing needs such as in the Microsoft Digital Audio standard. To provide for these multiple protocols, two oscillators OSC1 57 and OSC2 59 are required. The two oscillators are required since not all sample rates which may be needed by the A/D converters can be generated from the single frequency that can be provided by an oscillator that would be practical to implement in an ASIC. However, only one of the oscillators is in use at any one time depending on the sample rates which are required. The two independent oscillators enable all required sample rates to be generated by sample rate generators 123 and 125 by integer division of the oscillator frequencies.

An interface to a digital signal processor (DSP) and microcontroller is also provided. The modem channel (channel 0) communicates serially (serial interface 63) through a high speed link that is compatible with most DSPs. Both channels have Programmable Gain Adjust (PGA) 87 and 89 used to adjust analog inputs to A/D converters 51a and 53a respectively, and attenuators/-filters 54 and 55 for attenuating and filtering the analog outputs from D/A converters 51b and 53b respectively. All of such adjustments may be made under program control.

The circuits making up the two channels, namely A/D and D/A converters 51a, 51b, 53a, 53b, serial interface 63, programmable gain adjust 87 and 89 and attenuators/filters 54 and 55 are, effectively a pair of CODECs (encoder/decoder) available from Crystal Semiconductor of Austin, Tex., part no. CS5215 described in a specification dated March, 1992-DS76PP5. The differences between the parts available from Crystal and the equivalent circuits used in the present invention are that each of the A/D and D/A converters are separately controlled by sample rate, input gain, output attenuate and feedback control. The specific changes which need to be made to the prior art CODECs should be apparent to persons skilled in the art in view of the descriptions contained herein.

The audio channel (Channel 1) is buffered through programmable FIFOs 65a and 65b to the parallel data interface AD(7:0). These FIFOs act as a buffer to store a number of samples of audio data before the microcontroller 27 (see FIG. 1) needs to process them. In a preferred embodiment, up to 256 bytes can be stored in each of the FIFOs. Companded 8-bit $\mu$-law or A-law data is also supported as part of the functionality, the specifics of which are defined in the Crystal Semiconductor CODEC as described above. The audio channel analog input can be input through an on-chip amplifier 67 from a microphone 17 or similar source. The audio line output 69b is differential and can drive a set of headphones or speaker 19.

A fixed sample rate 8 bit analog-to-digital converter 71 with a 3 input MUX 73 provides battery level monitoring and similar functions.

Two power down modes are provided by two external signals ($\overline{PDN}$ (power-down) and OSCEN (oscillator enable)) generated by microcontroller 27. In microcontroller 27 IDLE mode, $\overline{PDN}$ is asserted by the microcontroller and all internal clocks are stopped and bias currents are turned off. The selected oscillator (OSC1 57 or OSC2 59 depending on selection criteria described below) is still powered up if OSCEN is asserted at the same time. OSCEN directly enables the selected oscillator (OSC1 57 or OSC2 59) and thus the invented communications analog front end can be fully powered down by asserting $\overline{PDN}$ and deasserting OSCEN. When an external clock is used instead of a crystal clock (75 or 76 depending on the selected oscillator), the OSCEN input should be deasserted (low), since this signal disables the feedback in the selected oscillator OSC1 or OSC2.

The remaining major elements of the invented communications analog front end, namely clock (CLK) 101, control 103, difference circuit 91, sample rate generators (SRG) 123 and 125, timing generators 121, reference sources 131, 135 and 137, and more complete descriptions of the other elements will now be described in terms of the processing and operation of the invented communications analog front end.

Analog Signals

The following is a description of each of the analog inputs to and outputs from the invented communications analog front end.

TABLE 1

| Name | Description |
| --- | --- |
| LINE0 | Channel 0 Line Input (from DAA 47) |
| LINE1 | Channel 1 Line Input (unused) |
| MIC | Channel 1 Microphone Input (from microphone 17) |
| OUTP0 | Channel 0 Line Output (in phase) (to DAA 47) |
| OUTN0 | Channel 0 Line Output (180° phase) (to DAA 47) |
| OUTP1 | Channel 1 Line Output (in phase) (to speaker 19) |
| OUTN1 | Channel 1 Line Output (180° phase) (to speaker 19) |
| LFIN1 | Low Frequency Input 1 (from external battery) |
| LFIN2 | Low Frequency Input 2 (from external battery) |
| LFIN3 | Low Frequency Input 3 (from external battery) |
| VREFLS | Voltage Reference (connect to bypass capacitor) |
| VREF0 | Voltage Reference (connect to bypass capacitor) |
| VREF1 | Voltage Reference (connect to bypass capacitor) |
| CMOUT0 | Common Mode Ref. O/P (Ch0) (to DAA 47) |
| CMOUT1 | Common Mode Ref. O/P (Ch1) (to speaker 19) |
| CMOUTLS | Common Mode Ref. O/P (LF A/D) (unused) |
| Spkr | Modem Digital Audio Output (to speaker 95) |

Figure 3:
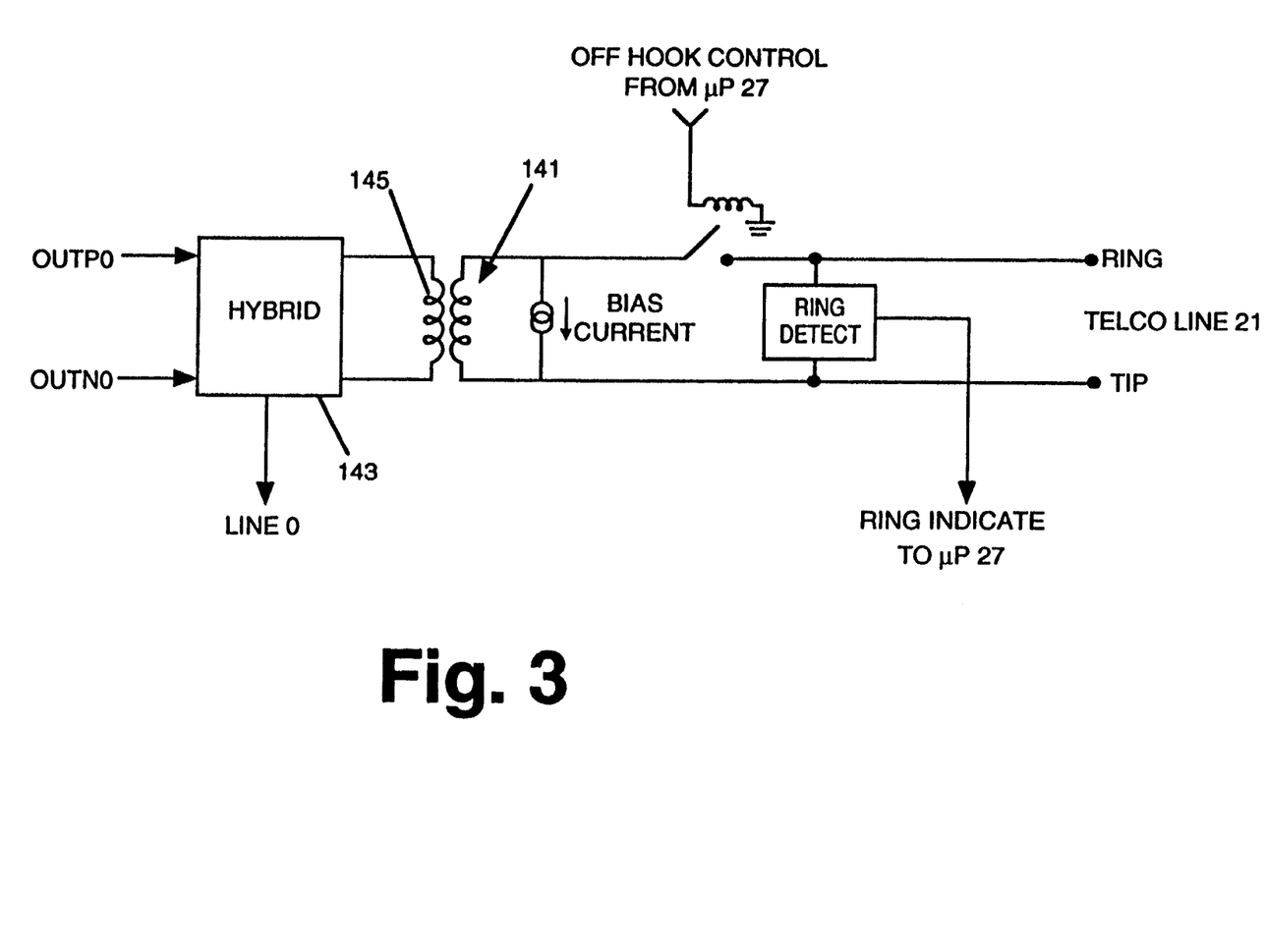
FIG. 3 is a block diagram of DAA 47.

DAA (data access arrangement) 47 acts as an interface between a telephone line and the A/D and D/A converters 51a and 51b. A suitable DAA is shown in FIG. 3 where OUTP0 and OUTN0 drive an impedance matching transformer 141. A hybrid network 143 is used to extract the signal received from the Telco line 21 which is superimposed on the transmitted signal at the transformer secondary 145 to minimize reflection of the transmitted signal from OUTP0 and OUTN0.

Analog Inputs

The audio channel 81 and modem channel 83 line inputs are identical in nature. These pins are internally biased to the CMOUT voltage (CMOUT0 and CMOUT1). In a preferred embodiment, the inputs are internally buffered to eliminate the need for external conditioning circuitry in most cases. However, an external amplifier circuit can be used. These inputs can be driven from a variety of sources, but are specially suited to being driven from the receive output of a hybrid Data Access Arrangement (DAA) 47. A 0.47 $\mu$F series capacitor (not shown) is required to decouple the line inputs.

For the microphone input 17, an internal amplifier 67 with 20 dB gain is provided. This allows the direct connection (with suitable 0.47 $\mu$F decoupling capacitor) from a condenser or similar microphone. However, an external preamplifier should be used with certain types of microphones that provide low signal levels.

As previously noted, both channels have Programmable Gain Adjust (PGA) 87 and 89 before being input to the A/D converters 51a and 53a respectively. Preferably, the gain should be adjustable in 1.5 dB steps up to a maximum of 22.5 db.

An external reference can be connected to any of the VREF0, VREF1 and VREFLS inputs which are reference voltage inputs for the A/D converters 51a, 53a and 71 respectively. The appropriate controls bits (described below) must be reset to '0' (power on default) to disable the on-chip reference voltages 131, 135 and 137. The voltage reference sources 131, 135 and 137 may be built into the ASIC or may be supplied externally. The specific implementation details of the voltage reference sources should be readily apparent to persons skilled in the field of the invention.

Inputs LFIN1, LFIN2 and LFIN3 are connections from the positive terminals of batteries whose power it is desired to monitor by conversion to a digital signal by A/D converter 71, and then placed on bus AD(7:0) for processing by microcontroller 27.

Analog Outputs

Both channels have a differential line output 69a and 69b respectively, centered on the CMOUT voltage (CMOUT0 and CMOUT1 respectively). The modem channel's line output 69a is capable of driving loads as low as 2k ohms. However, an output loading of 10 kohms would typically be present.

The audio channel line output 69b is capable of driving a headphone (>8 ohms) directly in a bridge mode. However, the use of an 8 W speaker or headphone significantly increases the power consumption at maximum volume. Load impedances greater than 32 ohms should be present to minimize power consumption. External resistors (12 ohms for example) in series with both outputs enable headphones with a wide variation in impedances (32 to 100+ohms) to be used without appreciable change in output volume.

For modem functions, a comparator 91 is included to provide a digital audio output. This comparator is used to drive a logic output waveform. It is connected to the hybrid DAA 47 so that monitoring of the tones on the line can be achieved through speaker 95 of PC 15. The reference input of the comparator is the internal reference voltage CMOUT0. The receive analog input LINE 0 and the transmit analog output OUTP0 are summed together before they are input to the comparator. Using this arrangement, either the received signal or the transmitted signal (assuming half duplex operation) is output digitally from the comparator. The comparator 91 can be turned on and off by software. When switched off, the comparator output is held high.

Digital Signals

The following is a description of each of the digital inputs to and outputs from the invented communications analog front end.

TABLE 2

| Name | Description |
| --- | --- |
| SDRX0 | Receive Data for Channel 0 (to D/A 51b)) |
| SDTX0 | Transmit Data for Channel 0 (from A/D 51a) |
| SCLK0 | Serial Bit Clock output for Channel 0 |
| FSYNC0 | Frame Sync Signal output for Channel 0 |
| OSC1.0 | Primary Oscillator Output (crystal 75) |
| OSC1.1 | Primary Oscillator Input (crystal 75) |
| OSC2.0 | Secondary Oscillator Output (crystal 76) |
| OSC2.1 | Secondary Oscillator Input (crystal 76) |
| FOSC | External Clock Output |
| OSCEN | Oscillator Enable Signal (powers down oscillator) |
| PDN | Power down Input (does not power down oscillator) |
| RESET | Reset Input (active High) |
| INT | Microcontroller 27 Interrupt Output |
| AD(7:0) | Parallel Address/Data Bus (for microcontroller 27) |
| ALE | Address Latch Enable Input (from microcontroller 27) |
| RD | Read Enable (active Low) (from microcontroller 27) |
| WR | Write Enable (active Low) from microcontroller 27) |
| CS | Chip Select (active Low) (from microcontroller 27) |

Digital Inputs

The digital inputs are generated by a DSP 35 and a microcontroller 27 and are provided to serial interface 63, clock 101, and control 103 as described below.

Digital Outputs

The digital outputs are input to a DSP 35 through serial interface 63, and to a microcontroller 27 through clock 101, and control 103 as described below.

Serial Interface 63

The serial interface 63 is used to transfer data between DSP 35 and the modem channel A/D and D/A converters 51a and 51b. A serial shift clock (SCLK0) from the invented analog front end is used to shift in data for the modem D/A converter 51b (on SDRX0) and shift out data from the modem A/D converter 51a (on SDTX0). This is done at either 8 or 16 bits per frame. A frame start is signaled using the frame sync signal (FSYNC0) from the invented analog front end.

The frame sync goes high with the rising edge of SCLK0 and remains high for at least one clock period. The data is output on the next rising edge of SCLK0, most significant bit first. Frame syncs continue to be output for as long as either converter (A/D 51a or D/A 51b) is enabled.

The received data for the D/A converter 51b is internally latched on the falling edge of SCLK0. An external source must use the rising edge to output this data with a sufficiently small delay to meet the input set up requirements of serial interface logic 63.

In operation, both the receive port and the transmit port are in sync with each other. That is, the frame sync signal serves to signify the start of a receive frame at the same time that a transmit frame is about to be output. The serial interface 63 must transfer the data to the D/A converter 51b after the required number of data bits have been received. The frame length can be set to either 8 or 16 bits.

Serial interface 63 can be disabled by writing a logic low to communication control register 1, bit 0 (described below). When this occurs, the SDTX0, SCLK0 and FSYNC0 outputs are placed into a high impedance state.

While the serial interface 63 is enabled, i) the FSYNC0 outputs toggle at the A/D converter 51a and D/A converter 51b sample rate, and ii) the SCLK0 output toggles at either 8 times or 16 times the sample rate depending on the value of bit 0 in Channel Control Register D. Both outputs stop toggling whenever serial interface 63 is disabled. However, there are some conditions when these outputs are forced into a continuous low state. When the converters 51a/51b are disabled, FSYNC0 will remain low after the current output frame has completed. Also SDTX0 remains low during this time. If only the D/A converter 51b is enabled, FSYNC0 will occur at the appropriate rate for the receive data, while SDTX0 remains low. If only the A/D converter 51a is enabled, the receive data on SDRX0 is ignored.

D/A and A/D Converters

Channel 0 and Channel 1 D/A converters 51b and 53b accept data in two's complement form. Similarly, the data output by the A/D converters 51a and 53a in these two channels is also two's complement. The monitor A/D converter 71, however, outputs in a binary format. Thus, a value of 0 equates to midrange for channels 0 and 1 and to the lowest input value for the monitor A/D. A full scale input voltage on the monitor A/D produces FF'H' as the converted output. Implementation details for the channel 0 and channel 1 converters should be apparent from this description which details the differences between the A/D, D/A converter pairs available from Crystal Semiconductor as part no. CS5215.

Parallel Port

The parallel I/O port (not shown) which is part of control 103 is a register type interface. An eight bit address/data bus AD(7:0) is used to load and read from internal control, status and data registers. Addresses are internally latched using the ALE input. There are status/control/data registers that can be written to. The functions of these registers are discussed below.

Control 103 Registers

The invented communications analog front end contains a number of registers that are accessible through a microcontroller parallel interface. The location of these control registers within the microcontroller's memory space is controlled externally by microcontroller 27 and a single chip select $\overline{CS}$ is provided. The registers are addressed by an address placed on bus AD(7:0) by microcontroller 27. Data is written to or read from an addressed register on bus AD(7:0). Such addressing and data handling are according to well known prior art techniques.

TABLE 3

Channel Control Register A

| Bit | Function | Reset Value |
|---|---|---|
| 0 | Audio channel input MUX 92 select; 1 = Line (mic amp 67 powered down) 0 = mic | 1 |
| 1 | Analog VREF enable (Reference 131 or 135) | 0 |
| 2 | Line Output Driver Enable; 1 = Enable, 0 = Tristate, Powered Down | 0 |
| 3 | Enable A/D Conversion; Channel is powered down when 0 | 0 |
| 4–7 | Gain Level (1.5 dB steps; if set to 0000, gain stages are bypassed and powered down). | 0 |

There are two Channel Control Register A, one for Channel 0 and one for Channel 1. Disabling the A/D conversion on Channel 0 disables the serial interface 63 after the current sample has been output.

Disabling bit 2 powers down both line outputs, OUTP and OUTN.

Bit 1 is used to power down the voltage references for each channel. Typically, 50 mS are needed for reference 131 or 135 to achieve final voltage after enable.

Bits 4–7 are used to control gain controls 87 and 89.

TABLE 4

Channel Control Register B

| Bit | Function | Reset Value |
|---|---|---|
| 0 | Output Level Bit (OLB) | 0 |
| 1 | Enable D/A Conversion, Channel is powered down when 0 | 0 |
| 2–7 | Attenuate Level (1.5 dB steps, if set to 000000, attenuators are bypassed and powered down). | 0 |

There are two Channel Control Register B, one for Channel 0 and one for Channel 1. Disabling the D/A conversion on Channel 0 and Channel 1 powers down mute controls 70a and 70b respectively.

When OLB=0, Channel 0 outputs are 2.0 V peak to peak (4.0 V differential), Channel 1 outputs are 4.0 V peak to peak (8.0 V differential).

When OLB=1, Channel 0 outputs are 2.8 V peak to peak (5.6 V differential), channel 1 outputs are 2.0 V peak to peak (4.0 V differential).

Bits 2–7 set the attenuation levels of attenuator/filters 54 and 55.

TABLE 5

Channel Control Register C

| Bit | Function | Reset Value |
|---|---|---|
| 0–3 | Sample Rate Select Code (see Table 6 below) | 0100 (= 8 kHz) |
| 4 | Enable Timing Generator 121, Channel 0 | 0 |
| 5 | Enable Timing Generator 121, Channel 1 | 0 |
| 6 | Enable Timing Generator 121, Monitor A/D | 0 |
| 7 | Unused | 0 |

TABLE 6

Sample Rate Selection Guide

| Code | Sample Rate | Osc. Freq. = 18.432 MHz Divisor | Osc. Freq. = 22.5792 MHz Divisor |
|---|---|---|---|
| '0000 | 1.2 kHz | 15360 | 18816 |
| '0001 | 1.8 kHz | 10240 | 12544 |
| '0010 | 2.4 kHz | 7680 | 9408 |
| '0011 | 7.2 kHz | 2560 | 3136 |
| '0100 | 8.0 kHz | 2304 | n/a |
| '0101 | 8.23 kHz | 2240 | n/a |
| '0110 | 9.0 kHz | 2048 | n/a |
| '0111 | 9.6 kHz | 1920 | n/a |
| '1000 | 10.29 kHz | 1792 | n/a |
| '1001 | 11.025 kHz | n/a | 2048 |
| '1010 | 16.0 kHz | 1152 | n/a |
| '1011 | 22.05 kHz | n/a | 1024 |
| '1100 | 36.0 kHz | 512 | n/a |
| '1101 | 41.143 kHz | 448 | n/a |
| '111x | 44.1 kHz | n/a | 512 |

The are two Channel Control Register C, one for Channel 0 and one for Channel 1. However, bits 4–6 exist only for the Channel 0 register. All sample rates except the audio sample rate (11.025, 22.05, 44.1 kHz) can be achieved by taking an integer divisor of the primary oscillator frequency (OSC1 set at 18,432 MHz). When these audio sample rates are required, the secondary oscillator must be used (OSC2 set at 22.5792 MHz). The details of how this is done are described below. Integer multiples (greater than or equal to 2) of sample rates between the two channels will result in significant degradation of performance.

Register C for Channel 0 uses bits 4, 5 and 6 to control the internal timing generators 121 for channel 0, 1 and the monitor A/D 71 respectively. For the best signal to noise performance, the timing generators should be enabled at the same time by writing a '1' to all three bits. Whenever a change in sample rate occurs for any channel, the timing generators should be disabled first by writing '0's to these bits.

TABLE 7

Channel Control Register D

| Bit | Function | Reset value |
|---|---|---|
| 0 | 8/16 bit data sample size: 1 = 16 bit 0 = 8 bit Frame size for Channel 0 | 1 |
| 1 | Line output Mute 70a, 1 = Mute | 1 |
| 2–3 | Companding mode mute 70b: 01 = μ-law 10 = A-law 00 = 16 bit linear 11 = 8 bit linear (Channel 1 only) | 0 |
| 4–7 | Monitor path attenuation 132a and 132b level, MA(3:0) Attenuation = 6 dB * MA(3:0) 0000 = no attenuation | 1 |

TABLE 7-continued

| | Channel Control Register D | |
|---|---|---|
| Bit | Function | Reset value |
| | 1111 = mute monitor path | |

The are two Channel Control Register D, one for Channel 0 and one for Channel 1.

Bit 0 sets the precision of the data between 8 and 16 bits. Bit 1 mutes the line outputs OUTP and OUTN for each channel. Bits 2 and 3 set the type of companding protocol to use for the data, between 8 bit $\mu$-law, 8 bit A-law or 8 or 16 bit linear. Bits 4–7 regulate the amount of feedback from the A/D converter to the D/A converter for Channel 0 or 1.

TABLE 8

| | Communication Control Register 0 | |
|---|---|---|
| Bit | Function | Reset Value |
| 0-1 | Monitor A/D Input MUX 73 Select:<br>00 = VREF<br>01 = LFIN1<br>10 = LFIN2<br>11 = LFIN3 | 0 |
| 2 | Comparator 91 Enable, 1 = Enable, 0 = Output High | 0 |
| 3 | Monitor A/D 71 VREFLS Enable | 0 |
| 4 | Monitor A/D 71 Enable | 0 |
| 5 | Unused | 0 |
| 6 | Unused | 0 |
| 7 | Unused | 0 |

Bit 2 is used to enable comparator 91. When reset (to 0), the output of comparator 91 is held in a logic high state. When enabled, comparator 91 outputs a digitized form of the signals appearing on the LINE0 and OUTP0 pins.

Bit 3 is used to power down the monitor A/D converter 71 reference VREFLS. It takes up to 50 mS for the reference voltage to reach its final value after this bit has been set to a 1.

Bit 4 is used to power down the monitor A/D converter 71. This bit should be set to enable the converter after bit 3 has been set. If bits 3 and 4 are set together, at least 50 mS must elapse before a valid sample is read.

For calibration, the input MUX 73 is set at '00' and a sample is generated of the internal reference voltage source 137 by monitor A/D converter 71. The difference between this value and the ideal value of 80H is the offset to be added to all subsequent samples obtained from the monitor A/D.

TABLE 9

| | Communication Control Register 1 | |
|---|---|---|
| Bit | Function | Reset Value |
| 0 | Enable Serial Port 63, Outputs tristate when low | 0 |
| 1 | Reserved | 0 |
| 2 | Oscillator select (OSC1 = 0, OSC2 = 1) | 0 |
| 3 | Reserved | 0 |
| 4 | Auto calibrate | 0 |
| 5 | Enable Loopback Testing | 0 |
| 6 | Reserved | 0 |
| 7 | Loopback Mode, DAD bit, 1 = D-A-D, 0 = D-D | 0 |

Bit 0 enables the serial interface 63. Bit 2 selects which oscillator, 57 or 59, for timing generators 121 to use. Bit 4 allows an automatic self calibration of the converters 51a, 51b, 53a and 53b to be performed. Bit 5 and Bit 7 are used to perform loopback tests on Channel 0 and Channel 1. D-A-D means to loopback digital inputs from DSP 35 through D/A converters 51b and 53b, then back through A/D converters 51a and 53a to DSP 35. D-D means to loopback input SDRX0 through serial interface 63 to output SDTX0.

TABLE 10

| | FIFO Buffer Size Register | |
|---|---|---|
| Bit | Function | Reset Value |
| 0-7 | FIFO Buffer Size.<br>(Specifies the number of bytes the FIFO will contain before an interrupt is generated.)<br>00 = bypass FIFO RAM<br>01 = 1 byte<br>10 = 2 bytes<br>.<br>.<br>.<br>FF = 255 bytes | FF |

When a value of 00 is written, FIFOs 65a and 65b are bypassed. In this mode, data is written directly to D/A converter 53b and/or read from A/D converter 53a. When this mode is used, the converter must be set to 8 bit mode (channel 1 Control Register D).

In 16 bit mode, the buffer size should be set to a multiple of 2.

TABLE 11

| | Clock Control Register A (Channel 0 only) | |
|---|---|---|
| Bit | Function | Reset Value |
| 0-6 | Clock Adjust Amount, N<br>(works in conjunction with Block Size Specify, M) | 0 |
| 7 | Clock advance/retard<br>1 = Advance clock, 0 = retard) | 0 |

TABLE 12

| | Clock Control Register B (Channel 0 only) | |
|---|---|---|
| Bit | Function | Reset Value |
| 0-7 | Block Size Specify, M<br>(works in conjunction with Clock Adjust Amount, N) | 0 |

Sample Clock Adjust

Clock control register A and clock control register B are used to provide a sample clock adjust for sample rates between 1.2 kHz and 16 kHz. The two clock adjust control registers in control 103 enable the movement of the sample point in the A/D and D/A converters of Channel 0. When these registers are written, the sample point will advance or retard N oscillator periods within M samples. The value of M must be written to first. The action of writing to clock control register A begins the advance or retard depending on the value of bit 7 at the next sample. Only one oscillator period is added or subtracted to any sample period. Thus adjustments are made immediately following the write for the first N samples and repeats every M samples. Advancement or retardation will continue for as long as the values of N and M are both non zero. Setting either N or M to zero disables clock adjustment.

Calibration Control Register

Writing to this register performs a self-calibration of the input offset error and output offset voltage for both channels. The value written is not important and is ignored.

TABLE 13

Status Register

| Bit | Function |
| --- | --- |
| 0 | Receive FIFO 65b frame full flag |
| 1 | Receive FIFO 65b full flag |
| 2 | A/D 51a over range (Channel 0) flag. (Reset when this register is read) |
| 3 | A/D 53a over range (Channel 1) flag (Reset when this register is read) |
| 4 | Transmit FIFO 65a empty flag |
| 5 | Transmit FIFO 65a underrun flag |
| 6 | Calibration in progress (channel 0) |
| 7 | Calibration in progress (channel 1) |

Bits 2 and 3 are reset whenever the status register is read. No identification of which sample caused the flag to be set is given.

All other flags stay active for as long as the particular condition persists.

The calibration bits (6 and 7) indicate when a calibration cycle is in progress and will clear when complete. Data sent to the D/A converters 51b and 53b is ignored as are the analog inputs during calibration.

TABLE 14

ID Register

| Bit | Function | Reset Value |
| --- | --- | --- |
| 0-5 | Identification ID | '000000 |
| 6 | Reserved | 0 |
| 7 | Reserved | 0 |

The identification ID is used to signify the current revision of the ASIC as well as the part number.

Monitoring A/D Output Register

This register yields the output of the monitor A/D converter 71. The microcontroller 27 is expected to add sufficient delay to enable the converter to read the register contents. At most, 1 mS will elapse between input MUX 73 selection and correct data being available in this register.

Data is binary from 00 at the minimum voltage input to FF'H' at the maximum.

Receive FIFO Register

Reading this register outputs the first sample that was placed into FIFO 65b by A/D converter 53a. The FIFO 65b is organized as 256 by 8 bits wide. After reading, the internal address pointer increments to the next location and the receive FIFO count register is decremented. Two reads are required to retrieve a 16 bit sample. The order of the data is most significant byte first. When $\mu$ or A law companding is used, each read provides a single sample.

Data is two's complement.

Transmit FIFO Register

The next sample to be output from D/A converter 53b is written into this register. The transmit FIFO 65a is organized as 256 by 8 bits wide. After writing, the address pointer is incremented to the next location and the FIFO count register is incremented. D/A converter 53b uses the FIFO samples in the order that they were written. Two writes are required for a 16 bit sample. The order of the data is most significant byte first. When $\mu$ or A law companding is used, each write provides a single sample.

Data is two's complement.

Audio FIFO Operation

The audio channel contains two 256 byte circular buffers acting as FIFOs 65a and 65b. The receive FIFO 65b accepts data from A/D converter 53a. When the number of entries in the buffer equals the value set in the FIFO Buffer Size register, the Receive FIFO Frame Full flag bit in the Status Register is set. An interrupt is generated to signal the host processor (microcontroller 27) that it must service FIFO 65b. The microcontroller 27 is expected to read the first sample contained within the FIFO before the next sample is loaded from the A/D converter 53a. Reading the FIFO 65b clears the interrupt signal. If microcontroller 27 fails to read the samples, the FIFO will continue to accept samples from A/D converter 53a until the full 256 bytes have been filled. At this point the Receive FIFO full flag in the Status Register is set. The A/D converter's address pointer rolls over at this point and subsequent samples will overwrite the oldest samples in the receive FIFO 65b.

The transmit buffer works in reverse to the receive FIFO. As long as transmit FIFO 65a is not empty, data written to it is fed on a first-in first-out basis to D/A converter 53b whenever the channel is enabled. The value written into the FIFO Buffer Size register specifies the point at which an interrupt is generated. When the number of "empty" bytes in the FIFO equals this number the Transmit FIFO Buffer Empty flag is set in the status register and the interrupt output, INT is driven active. D/A converter 53b continues to obtain samples from FIFO 65a until 256 bytes are marked as empty. At this point the Transmit FIFO Buffer Underrun flag is set in the status register. It is expected that the first time that data is written into FIFO 65a, the full 256 bytes are loaded. The Buffer Size register is set at some lower number, n. This allows the interrupt service routine running on microcontroller 27 the time it takes (256-n) samples to be used up by the D/A converter before it must start reloading the next n sample bytes. If no samples are written to the FIFO and the FIFO becomes totally empty, D/A converter 53b will continue to output the last sample it processed.

Clock Generation

The master clock for the communications analog front end is driven from one of two on-chip crystal oscillators OSC1 and OSC2. The oscillators are designed for parallel resonant, fundamental mode crystals 75 and 76, with the optimum frequency being between 18 and 24 MHz. From these sources, a number of sample rates used in communication products can be generated.

An external clock output FOSC is provided that is equal to the oscillator frequency. This can be used for the microcontroller 27/DSP 35 clock input. In this connection, the communications analog front end and all external components should be run from the same frequency source.

Details for changing the selection of oscillator are described below.

Sample Rate Generation

The invented communications analog front end can generate all sample rates for most communication protocols with sample rate generators 123 and 125. However, to allow a more flexible frequency choice for the crystal 75 and 76, two oscillators are provided OSC1 and OSC2. Using a single master frequency for all protocols limits the choice of crystal frequencies, since the crystal frequencies must be a multiple of the Lowest Common Multiple (LCM) of all the sample rates. Since the DSP 35 and microcontroller 27 should use the same frequency (or sub-multiple) as the communications analog front end, the maximum clock rate of these components must also be taken into account. Using two oscillators allows for this scenario.

Monitor Path

To allow monitoring of the input audio signal from microphone 17, the output of each A/D converter 51a and 53a is routed through a monitor path attenuator (part of attenuator/filters 54 and 55), then digitally mixed into the input data for the D/A converters 51b and 53b. Changes in the input gain setting directly affect the monitor level. Changes in the output level setting directly affect the monitor output level. If full scale data from the A/D converters 51a and 53a is added to full scale digital data from the serial interface 63, then clipping will occur.

Power Down Mode

There are two inputs that are used to set the power down operation of the communications analog front end. OSCEN is a direct input to the crystal oscillators OSC1 and OSC2. When it is deasserted, the selected oscillator is stopped and put into a power down mode. This is the minimum state and requires only leakage current from the supplies (analog and digital). Another mode (IDLE), which may or may not be an idle mode of microcontroller 27 occurs when the $\overline{PDN}$ input is asserted low while OSCEN is enabled. In this case, the internal clock generator CLK 101 will stop all clocks within the communications analog front end and turn off any bias currents within the analog section. Note, however, that the FOSC pin is not disabled in this mode and will continue to output FOSC.

When an external oscillator is used to generate the clock CLK 101, the OSCEN input should be tied low. The communications analog front end switches between active and IDLE modes by setting the $\overline{PDN}$ pin low and high respectively. To obtain a minimum power level, $\overline{PDN}$ must be low and external clocks from an external oscillator, if any, must be stopped.

Various other power down combinations can be achieved by writing to the control registers. Several of these bits are dedicated to turning off certain sections of the communications analog front end such as the converters and line amplifiers. In this way a minimum power system can be designed.

Oscillator Switching

The following sequence of events must be carried out when switching between oscillators 57 (OSC1) and 59 (OSC2):

When the application software requires a change in frequency, it signals microcontroller 27 which instructs control 103 to set or reset the oscillator select bit (bit 2 of Communication Control Register 1) in the communications analog front end.

Microcontroller 27 then sets its power down bit and a HALT instruction is executed by microcontroller 27 which powers down the system.

On receipt of the falling edge of the OSCEN signal from microcontroller 27, the communications analog front end sets the appropriate internal oscillator select signal as specified by the control bit (bit 2 of Communication Control Register 1) and powers down.

The application software (a program in PC 15), after a suitable time, i.e., after allowing for the power down operation, sends an interrupt to microcontroller 27. On receipt of this interrupt, microcontroller 27 causes the OSCEN signal to become active ($\overline{PDN}$ is still active) and the communications analog front end powers up the selected oscillator.

After a predetermined time delay defined by an external capacitor coupled to microcontroller 27, the $\overline{PDN}$ signal goes inactive and the communications analog front end becomes active.

Timing Generators 121

Timing generators receive a clock signal from clock 101 and bits 4, 5 and 6 of register C for channel 0, 1 and the monitor A/D converter 71 respectively. Timing generators 121 generate variable rate clock signals which are input to sample rate generators 123 and 125 (for channels 0 and 1 respectively) and a fixed rate clock signal for A/D converter 71. Details regarding a suitable implementation of timing generators 121 may be found in co-pending application Ser. No. 08/120,583 filed Sep. 13, 1993.

Calibration

Both output offset voltage and input offset error are minimized by an internal calibration cycle. A calibration cycle for channel 0 and 1 occurs after every write access to the calibration register. Whenever the autocalibrate bit is set, a calibration cycle is initiated whenever a) the sample rate is changed, b) the Output Level Bit (OLB) is changed, or c) channel 1 is switched between line and microphone inputs. Some time must be allowed between powering up the communications analog front end, or exiting the power down state, and initializing a calibration cycle, to allow the voltage reference to settle. The reference voltage (131 for A/D converter 51a and 135 for A/D converter 53a) must be enabled for at least 50 mS after power up or exiting power down mode before writing to the calibration register. For the audio channel, the input offset error is calibrated for whichever input channel is selected (microphone or line). Calibration takes 194 FSYNC cycles and SDTX0 will be random during this period.

The Monitor A/D converter 71 calibrates to an internal reference voltage 137. This is achieved by setting the input MUX 73 select bits to 00. This selects the internal reference as the input to the A/D converter. After at least 1 mS, the data is read out. This value is then subtracted from 80 H. The resultant value obtained represents the internal offset of the converter. This number is used with all subsequent samples obtained to generate the actual data value. The offset remains valid for as long as the reference 137 remains enabled. If the reference is turned off, the offset should be recalculated.

Although not part of the invented communications analog front end, the other components of unit will now be described to the extent necessary for proper understanding of the invention.

Serial port 25 is a standard universal asynchronous receiver-transmitter (UART) such as 16550 available from National Semiconductor.

Microcontroller 27 may be any industry standard microcontroller used for communications such as an 80C186 available from Intel Corporation.

ROM 31 is a 512K read only memory which stores the programming for microcontroller 27. In the preferred embodiment, ROM 31 is a flash EPROM so that the programming can be easily changed as needed.

SRAM 33 is a 512K static random access memory used by microcontroller 27 to store program parameters and other data.

DSP 35 is a digital signal processor capable of operating to provide digital filtering of the signals processed by the analog front end and other signal processing traditional in the art.

Microcontroller 37 is a standard microcontroller capable of handling keypad inputs and LCD display 39 such as a 80C51FA available from Intel Corporation.

Transceiver 43 is the equivalent of a radio/transmitter combination of the type used in cellular telephone technology. Although the transceiver element of a cellular telephone is not normally sold by itself (i.e., without the other elements of a cellular telephone), a suitable transceiver can be easily constructed by persons skilled in the art.

Amplifiers 45 are used to drive speaker 19 and microphone 17. A suitable amplifier for both devices would be a MC34071 available from Motorola Corporation.

Hybrid DAA 47 including hybrid network 143 shown in FIG. 3 is a standard, well known circuit used in modems for connection to a telephone line.

LCD 39 is a liquid crystal display of the type available from, for example, Sharp Corporation.

Keypad 41 is a 16 key keypad available from a variety of sources.

I claim:

1. A communications analog front end for coupling to a personal computer through a digital signal processor and to a telephone network and microphone/speaker combination, said front end comprising:
   a) a first set of analog/digital and digital/analog converter means for providing analog to digital and digital to analog conversions for voice communications;
   b) a second set of analog/digital and digital/analog converter means for providing analog to digital and digital to analog conversions for data communications;
   c) first and second oscillator means for selectively generating first and second signals, each having a predetermined frequency;
   d) timing generator means for generating clocking signals based upon the frequencies of said first and second signals;
   e) first rate generator means for selectively generating predetermined independently controlled first sample rates based upon said clocking signals, said independently controlled first sample rates for use by said first set of analog/digital and digital/analog converter means;
   f) second sample rate generator means for selectively generating predetermined independently controlled second sample rates based upon said clocking signals, said independently controlled second sample rates for use by said second set of analog/digital and digital/analog converter means;
   g) control means for controlling a selection of one of said first and second pairs of analog/digital and digital/analog converter means, a selection of one of said first and second oscillator means, and a selection of one of said first and second sample rate generator means.

2. The front end defined by claim 1 wherein said first set of analog/digital and digital/analog converter means comprises an analog/digital converter coupled to a programmable gain adjust, said programmable gain adjust for coupling to a microphone and a digital/analog converter for coupling to a speaker.

3. The front end defined by claim 1 wherein said second set of analog/digital and digital/analog converter means comprises an analog/digital converter coupled to a programmable gain adjust, said programmable gain adjust for coupling to a telephone line through a data access arrangement and for coupling to a cellular telephone transceiver and, a digital/analog converter for coupling to a telephone line through said data access arrangement and for coupling to said cellular telephone transceiver.

4. The front end defined by claim 2 further comprising a programmable attenuator coupled to said digital/analog converter.

5. The front end defined by claim 3 further comprising a programmable attenuator coupled to said digital/analog converter.

6. The front end defined by claim 1 wherein said first and second signals generated by said first and second oscillator means respectively are input to said timing generator means to produce a set of clocking signals, each said clocking signal having one of a plurality of predetermined frequencies.

7. The front end defined by claim 1 wherein said control means comprises a set of programmable control registers coupled to said first set of analog/digital and digital/analog converter means, said second set of analog/digital and digital/analog converter means, said first and second oscillator means, said timing generator means and said first and second sample rate generator means, wherein said control registers are programmed by data placed on an address/data bus by operation of a microcontroller external to said front end.

8. The front end defined by claim 2 wherein said control means comprises a set of programmable control registers coupled to said first set of analog/digital and digital/analog converter means, said second set of analog/digital and digital/analog converter means, said first and second oscillator means, said timing generator means, said first and second sample rate generator means and said programmable gain adjust wherein said control registers are programmed by data placed on an address/data bus by operation of a microcontroller.

9. The front end defined by claim 3 wherein said control means comprises a set of programmable control registers coupled to said first set of analog/digital and digital/analog converter means, said second set of analog/digital and digital/analog converter means, said first and second oscillator means, said timing generator means, said first and second sample rate generator means and said programmable gain adjust wherein said control registers are programmed by data placed on an address/data bus by operation of a microcontroller.

10. The front end defined by claim 4 wherein said control means comprises a set of programmable control registers coupled to said first set of analog/digital and digital/analog converter means, said second set of analog/digital and digital/analog converter means, said first and second oscillator means, said timing generator means, said first and second sample rate generator means and said programmable attenuator wherein said control registers are programmed by data placed on an address/data bus by operation of a microcontroller.

11. The front end defined by claim 5 wherein said control means comprises a set of programmable control registers coupled to said first set of analog/digital and digital/analog converter means, said second set of analog/digital and digital/analog converter means, said first and second oscillator means, said timing generator means, said first and second sample rate generator means and said programmable attenuator wherein said control registers are programmed by data placed on an address/data bus by operation of a microcontroller.

* * * * *

UNITED STATES PATENT AND TRADEMARK OFFICE
CERTIFICATE OF CORRECTION

PATENT NO. : 5,386,438
DATED : January 31, 1995
INVENTOR(S) : David G. England It is certified that error appears in the above-identified patent and that said Letters Patent is hereby corrected as shown below:

In column 5 at line 53 delete "Secondarv" and insert --Secondary--

In column 5 at line 56 delete "PDN" and insert --$\overline{\text{PDN}}$--

In column 5 at line 60 delete "RD" and insert --$\overline{\text{RD}}$--

In column 5 at line 61 delete "WR" and insert --$\overline{\text{WR}}$--

In column 5 at line 62 delete "CS" and insert --$\overline{\text{CS}}$--

Signed and Sealed this

Sixth Day of May, 1997

*Attest:*

*Attesting Officer*

BRUCE LEHMAN
*Commissioner of Patents and Trademarks*